United States Patent
Martin et al.

(10) Patent No.: US 6,841,199 B2
(45) Date of Patent: Jan. 11, 2005

(54) METHOD FOR INHIBITING CORROSION BY POST-DIP OF COATED PARTS

(75) Inventors: James W. Martin, Pittsburgh, PA (US); Henry T. Austin, Cheswick, PA (US); Walter R. Stark, Holly, MI (US); Gordon C. Schafer, Lapeer, MI (US)

(73) Assignee: PPG Industries Ohio, Inc., Cleveland, OH (US)

( * ) Notice: Subject to any disclaimer, the term of this patent is extended or adjusted under 35 U.S.C. 154(b) by 135 days.

(21) Appl. No.: 10/133,293

(22) Filed: Apr. 26, 2002

(65) Prior Publication Data

US 2003/0203218 A1 Oct. 30, 2003

(51) Int. Cl.$^7$ ................................. B05D 7/00
(52) U.S. Cl. ................. 427/419.8; 427/419.1; 427/409
(58) Field of Search ............... 427/409, 419.1, 427/419.8, 405, 402, 403; 204/471; 205/191; 148/22

(56) References Cited

U.S. PATENT DOCUMENTS

| | | | | |
|---|---|---|---|---|
| 3,215,715 A | | 11/1965 | Wurstner et al. | 260/429.9 |
| 4,165,242 A | | 8/1979 | Kelly et al. | 148/6.15 Z |
| 5,139,824 A | * | 8/1992 | Liburdi et al. | 427/252 |
| 5,242,716 A | * | 9/1993 | Iwase et al. | 427/407.1 |
| 5,385,655 A | | 1/1995 | Brent et al. | 204/181.1 |
| 5,437,937 A | | 8/1995 | Cayless | 428/626 |
| 5,603,818 A | | 2/1997 | Brent et al. | 204/488 |
| 6,093,260 A | * | 7/2000 | Petrone et al. | 148/277 |
| 6,168,868 B1 | | 1/2001 | Hauser et al. | 428/457 |
| 6,190,525 B1 | | 2/2001 | Karabin et al. | 204/489 |
| 6,210,758 B1 | * | 4/2001 | McNeil et al. | 427/409 |
| 6,248,184 B1 | * | 6/2001 | Dull et al. | 148/275 |

FOREIGN PATENT DOCUMENTS

GB     1 398 047     6/1973

OTHER PUBLICATIONS

Y203–sealed Ni–Al protective coatings for Inconel 625, by T. Sugama, Department of Applied Science, Conservation Division, Energy Efficiency, Brookhaven National Laboratory, Upton, NY, 2001.
Abstract CS149285, Jul. 1975.

* cited by examiner

*Primary Examiner*—David J. Buttner
*Assistant Examiner*—Christopher Keehan
(74) *Attorney, Agent, or Firm*—Diane R. Meyers

(57) ABSTRACT

Methods for inhibiting corrosion are disclosed. The methods generally involve contacting a coated metal substrate with a composition comprising one or more of yttrium, titanium and the rare-earth elements. The contacting step can be performed either before or after the coating is cured. Substrates treated according to the present methods are also disclosed.

27 Claims, No Drawings

METHOD FOR INHIBITING CORROSION BY POST-DIP OF COATED PARTS

FIELD OF THE INVENTION

The present invention relates to methods for treating substrates to improve their corrosion resistance. More specifically, improved corrosion resistance is seen when coated metal parts are treated with the compositions described herein.

BACKGROUND OF THE INVENTION

It has been known in the metal finishing art to treat metal surfaces with various treatment layers, both to impart corrosion resistance and to provide pigmented coatings. U.S. Pat. Nos. 4,165,242; 5,385,655; and 5,603,818, for example, describe various pretreatment, coating and sealer compositions that impart corrosion resistance to metals. While virtually any metal is susceptible to corrosion, the problem can be particularly pronounced with small metal parts, such as nuts, bolts, screws, assemblies and other fasteners. These parts cannot be easily racked for treatment, and are therefore typically treated in bulk such as in a basket, on a conveyor line or in a barrel. Bulk treatment, however, can cause physical defects in the coating through contact points between the parts and by abrasion of the films due to reorientation, handling and transportation of the parts from one stage to the next. These defects invariably result in poor corrosion performance, with the coated parts showing significant rusting at the damaged sites within 48 hours of salt spray testing. These damaged sites are typically on, but not limited to, the sharpest edges of the parts, such as along a washer's edge, the crown of a bolt head and the outermost part of the bolt threads. Defects can also occur where the threads of one bolt cut into the film of another. This type of damage can occur anywhere in the coating, rinsing, unloading and/or curing processes. Process changes, formulation variations and coat-out parameters appear to have no significant role in correcting this problem.

SUMMARY OF THE INVENTION

The present invention is directed to a method for treating a coated metal substrate by contacting the substrate with a composition comprising at least one of yttrium, titanium, or the rare earth metals. The methods find particular application in the treatment of small metal parts, improving the corrosion resistance of these parts. The method is particularly suitable when bulk processing these parts, such as through use of a barrel or other container.

The compositions of the present invention impart corrosion resistance without the use of heavy metals or chromium, which are environmentally undesirable. Corrosion resistance is observed when using the present solutions over a wide range of concentrations; thus, the user does not need to constantly monitor the concentration of active ingredient in the solution. In addition, the treatment composition of the present invention will in most cases be compatible with the electrocoat bath and any carryover that may occur should not be an issue.

DESCRIPTION OF THE INVENTION

The present invention is directed to a method for treating a coated metal substrate by contacting the substrate with a composition comprising one or more of yttrium (Y), titanium (Ti), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). The atomic numbers of these elements are 39, 22 and 57–71, respectively. The term "elements" is used herein to collectively refer to this list of elements, unless noted otherwise. The elements with atomic number 57–71 are collectively known as the rare-earth elements; elements 57–62 are known as the cerium subgroup, and 63–71 as the yttrium subgroup. Yttrium, although not a rare earth element, is found associated with the rare earths. One or more of the listed elements can be used in the compositions of the present methods. Particularly suitable is yttrium.

The compositions used in the present invention typically employ one or more of the elements in an aqueous medium, usually in the form of an aqueous solution or dispersion, depending on the solubility of the element(s) being used. Most typically, the present composition will be an aqueous acidic solution of a salt of one or more of the elements. These salts include carboxylates including but not limited to acetate, lactate, glycolate, dimethylolpropionate, formate, and gluconate. Other suitable salts are nitrate, sulfate, chloride, bromide, iodide, chlorate, bromate, iodate and amino acid salts. Oxalate, oxide, hydroxide and carbonate salts have slight solubility and may also be effective under some conditions. Yttrium acetate is particularly suitable for the present methods.

As noted, the compositions used in the present methods are typically acidic in nature. The optimum pH to use for a particular application will depend on a number of factors including, for example, the metal that is being treated and the other layers of treatment applied to the metal, if any. One skilled in the art can determine the appropriate pH for use in a given application, and adjust the pH of the composition accordingly. The pH of the compositions will typically range between 4.0 and 6.5 with a pH of about 5.8 being most suitable.

The compositions used in the present methods are effective over a wide range of concentrations. For example, an active ingredient concentration as low as 400 ppm up to a concentration of about 5000 ppm can be used, such as a concentration of 1100 ppm+/−100 ppm; a yttrium acetate solution having this concentration has been found to be particularly effective. Because the present compositions are effective over a wide range of concentrations, the user does not need to constantly monitor the concentration of element (s) in the composition.

A variety of metal substrates are suitable for treatment according to the present methods. For example, the metal substrate can comprise a ferrous metal, such as iron, steel or alloys thereof. The steel can include cold-rolled steel, galvanized steel, electrogalvanized steel, stainless steel and combinations thereof. Treatment of nonferrous metals is also within the scope of the present invention, including, for example, alumina, zinc, magnesium or alloys thereof. Small metal parts are typically made of heat-treated mild steel.

While any metal substrate can be treated according to the present invention, the methods find particular application in the treatment of small metal parts that are handled in bulk. "Small metal parts" or "small parts" include, for example, nuts, bolts, screws, subassemblies, fasteners, clips stampings and brackets, such as those used in the manufacture of automobiles and airplanes. While the present methods are particularly applicable to small parts that have been processed in bulk, such as in a basket or barrel or on a belt (conveyor) coater, they are equally applicable to small parts that have been treated individually.

The substrates of the present invention are usually first cleaned to remove grease, dirt or other extraneous matter using conventional cleaning procedures and materials. These materials include mild or strong alkaline cleaners, such as those that are commercially available and conventionally used in metal pretreatment processes. Examples of alkaline cleaners include CHEMKLEEN 163 and CHEMKLEEN 167, both of which are available from PPG Industries, Inc. Such cleaners are generally followed and/or proceeded by a water rinse. The metal surface can be rinsed with an aqueous acidic solution after cleaning with the alkaline cleaner. Examples of such rinse solutions include mild or strong acidic cleaners, such as the dilute nitric acid solutions commercially available and conventionally used in metal pretreatment processes.

Following the cleaning step, the metal substrate can then be pretreated with one or more compositions that inhibit corrosion. These pretreatment solutions often contain an inorganic phosphate, which protects the metal surface to some extent against corrosion and provides a base for the later application of various organic coatings. The inorganic phosphate coatings are generally formed on a metal surface by means of aqueous solutions that contain phosphate ion. Suitable pretreatment solutions are widely commercially available, and are described, for example, in U.S. Pat. Nos. 6,168,868 and 6,312,812.

It will be understood that the various cleaning and pretreatment steps described above are optional, and can be performed with any variations desired by the user. The present invention is in no way dependent on the performance of these steps.

Following any of the optional steps described above, the substrates can then be coated with an organic composition such as a paint, lacquer, varnish, primer, synthetic resin, enamel and the like. Typically, the coating will be one that contains a pigment. The coating can be applied by any method known in the art such as dipping, immersing, spraying, and the like. A particularly suitable method of coating small parts treated in accordance with the present invention is by electrocoating.

Any cationic electrodepositable resin known in the art can be used according to the present invention. Suitable cationic resins are described, for example, in U.S. Pat. Nos. 4,891,111 and 6,190,524. A particularly suitable cationic resin is a sulfonium acrylic E-coat, such as those products in the POWERCRON 900 Series sold by PPG Industries, Inc. U.S. Pat. No. 6,190,524 describes particularly suitable cationic polyepoxide resins that may be chain extended by reacting together a polyepoxide and polyhydroxyl group-containing material selected from alcoholic hydroxyl group-containing materials and phenolic hydroxyl group-containing materials to chain extend or build the molecular weight of the polyepoxide. Cationic resins that are the reaction products of a polyepoxide with an oxygen-substituted diamine compound are also suitable; such compounds are described in U.S. Pat. No. 5,820,987. Both high epoxy and low epoxy resins can be used. Other suitable resins are described in U.S. Pat. Nos. 3,455,806; 3,663,389; 3,793,278; 3,928,157; 3,947,338; 3,947,339; 3,962,165; 3,975,346; 3,984,299; 3,984,922; 4,001,101; 4,134,866; 4,134,932; and European Application No. 12463. The relevant portions of the patents referenced in this paragraph are all hereby incorporated by reference.

Standard electrodeposition methods and parameters can be employed to coat small parts. Basically, an adherent film of a coating composition is deposited on the substrate when a sufficient voltage is impressed between the electrodes. The applied voltage may be varied and can be, for example, as low as one volt to as high as several thousand volts; typically the voltage will be between about 50 and 400 volts. The current density is usually between 1.8 amperes and 7.5 amperes per square foot and tends to decrease during electrodeposition, indicating the formation of an insulating film.

A common procedure for electrocoating small metal parts comprises placing the parts to be treated in a rotatable, porous barrel. The parts can be processed in the barrel through the cleaning, pretreatment, and optional rinse stages. The same barrel of pretreated parts can then be immersed in the electrocoat paint, either after drying the parts or while still wet. As an example, the barrel of parts is rotated intermittently for 5 minutes at about 25° C. to 32° C. (77° F. to 90° F.) at a voltage of 150 to 350 volts and five amps. The number of rotation cycles employed may be varied depending on the type and quantity of parts in the barrel.

As used herein, the term "coated" when referring to a substrate means that the substrate has had an organic layer, such as a paint or electrodepositable resin, applied thereto; "coating" refers to this layer or the process of applying the same. Thus, while conventional methods often teach treating metal parts with corrosion inhibitors before painting or coating, the present invention imparts corrosion resistance through the use of a "post-dip" step that occurs after the substrate has been coated.

Accordingly, following coating of the substrate, the substrate is then contacted with the present composition comprising the yttrium, titanium and/or rare-earth metal described above, which is sometimes referred to herein as the "post-dip composition". Significantly, the post-dip contacting step can be done either before or after the coating is cured. In one embodiment, the post-dip occurs before curing of the coating. The uncured substrate is contacted with the present composition for a period of time ranging from about 10 seconds to 5 minutes, such as about 2 minutes+/−30 seconds. The post-dip composition can then be rinsed from the substrate, if desired, although in most cases better results will be obtained if the post-dip composition is not rinsed prior to cure. Curing can then be effected at the temperature and time appropriate for the particular coating. A typical electrodeposited resin will cure at a temperature between 325° F. and 425° F., such as about 375+/−25° F. Cure times typically range from about 10 minutes to about 60 minutes, such as about 20 minutes.

In another embodiment, the coating on the substrate is cured, and then the substrate is contacted with the post-dip composition. The coated and cured parts can be dipped, for example, in the post-dip composition for any amount of time; between 1 and 100 minutes, such as about 60 minutes, +/−10 minutes, is typically sufficient. It will often be desired to dry the parts in an oven after contacting with the post-dip composition, such as for 1 to 30 minutes at a temperature of between about 300° F. and 400° F.

The post-dip contacting step of the present methods can be effected by any means known in the art, such as spraying, dipping, immersion and the like. When the small parts are treated and/or coated in bulk, such as in a barrel or basket, the coated parts can then be further treated with the present compositions in the same barrel or basket. In this embodiment, the entire barrel/basket could be immersed in the post-dip composition. In embodiments where the coating is not cured before post-dip contacting, the entire barrel or basket can itself be run through the oven at the appropriate temperature and for the appropriate length of time to cure the coating. Alternatively, the parts treated according to the present methods can be removed from the barrel and cured in any conventional manner. In embodiments where the parts are cured before the post-dip step, they can again either be cured directly in the barrel/basket or removed from the barrel/basket and cured by any conventional means. The cured parts can then be contacted with the post-dip solution through dipping, immersion, spraying and the like.

The post-dip composition can be used at room temperature, or alternatively can be heated prior to use. Heating the post-dip composition to a temperature of about 100+/−15° F. often gives better corrosion resistance as compared to the same post-dip at room temperature.

The post-dip compositions used in the present invention may also contain a resinous binder. If used, the resinous binder is typically present in the post-dip composition in an amount of 0.005% to 30%, such as 0.5 to 3%, based on the total weight of the ingredients in the composition. Suitable resins include reaction products of one or more alkanolamines and an epoxy-functional material containing at least two epoxy groups, such as those disclosed in U.S. Pat. No. 5,653,823. Such resins can contain beta hydroxy ester, imide, or sulfide functionality, incorporated by using dimethylolpropionic acid, phthalimide, or mercaptoglycerine as an additional reactant in the preparation of the resin. Alternatively, the reaction product is that of the diglycidyl ether of Bisphenol A (commercially available from Resolutia as EPON 880), dimethylol propionic acid, and diethanolamine in a 0.6 to 5.0:0.05 to 5.5:1 mole ratio. Other suitable resinous binders include water-soluble and water-dispersible polyacrylic acids such as those disclosed in U.S. Pat. Nos. 3,912,548 and 5,328,525; phenol formaldehyde resins described in U.S. Pat. No. 5,662,746, water-soluble polyamides such as those disclosed in WO 95/33869; copolymers of maleic or acrylic acid with allyl ether described in Canadian patent application no. 2,087,352; and water soluble and dispersible resins including epoxy resins, aminoplasts, phenol-formaldehyde resins, tannins, and polyvinyl phenols as discussed in U.S. Pat. No. 5,449,415, all of which are incorporated herein, in pertinent part, by reference.

The present compositions may optionally contain other materials such as nonionic surfactants and auxiliaries conventionally used in the art of metal treatment. In an aqueous medium, water-dispersible organic solvents, for example, alcohols with up to about 8 carbon atoms such as methanol, isopropanol, and the like may be present, glycol ethers such as the monoalkyl ethers of ethylene glycol, diethylene glycol, or propylene glycol, and the like. When present, water-dispersible organic solvents are typically used in amounts up to about ten percent by volume, based on the total volume of aqueous medium.

Other optional materials include surfactants that function as defoamers or substrate wetting agents. Anionic, cationic, amphoteric, or nonionic surfactants may be used. Compatible mixtures of such materials are also suitable. Defoaming surfactants are typically present at levels up to about 1 percent, preferably up to about 0.1 percent by volume, and wetting agents are typically present at levels up to about 2 percent, preferably up to about 0.5 percent by volume, based on the total volume of medium.

In addition, one or more pigments can be added to the present compositions. Any suitable pigment(s) can be used, such as carbon black. It is often desired to use a pigmented post-dip composition, particularly when using yttrium, as the yttrium can leave a white residue on the treated substrate. The pigment, if used, can be present in levels up to about 1.0%, such as 0.8%, based on the total weight of the composition.

The film coverage of the residue of the post-dip composition deposited through the present methods generally ranges from between about 1 and 1000 milligrams per square meter ($mg/m^2$), and is preferably between about 10 and 400 $mg/m^2$.

The present invention is further directed to a metal substrate comprising a pretreatment composition deposited upon at least a portion of the substrate, a coating composition deposited on top of the pretreatment composition, and the post-dip composition of the present invention deposited on top of the coating. The metal substrate, pretreatment composition, coating composition and post-dip composition are as described above.

The present invention is further directed to a method for inhibiting corrosion in a substrate comprising contacting the substrate with a composition comprising one or more of yttrium, titanium and the rare-earth elements.

As noted above, the present invention is particularly suitable for treating small parts that are processed in bulk. During such processing (cleaning, coating and the like), the parts are intermittently in contact with each other. As such, "contact points" develop in which corrosion is more likely, and can result in points wherein the coating experiences abrasion in which some portion of the coating may be removed, or the coating is removed altogether. "Removal" of the coating refers herein both to partial removal, such as through an abrasive mechanism, or to complete removal, such as through abrasion, chipping, scratching and the like. The present invention is therefore further directed to a method for treating coated metal substrates wherein some of the coating has been removed, in whole or in part, from one or more areas of the substrate. Such coated substrates having areas where the coating has been removed may result, for example, when small parts are in and out of contact with one another while being coated.

Yet another method of the present invention is for coating a plurality of metal parts by passing the parts through a bath of coating material such that coating material is deposited on the parts, and subsequently depositing the present post-dip composition on the coated parts. The parts can be contained in any suitable container, such as a barrel, basket and the like, or the parts can be on a belt conveyor. Use of a porous container or conveyor provides the coating material access to the parts. It will be appreciated that the parts are likely to contact one another intermittently during the coating stages, which can again result in coating removal. Any of the coatings and coating methods described above can be used here, with electrophoretic deposition being particularly suitable.

As used herein, except as used in the examples or unless otherwise expressly specified, all numbers may be read as if prefaced by the word "about", even if the term does not expressly appear. Also, any numerical range recited herein is intended to include all sub-ranges subsumed therein. As used herein, the term "polymer" refers to oligomers and both homopolymers and copolymers.

EXAMPLES

The following examples are intended to illustrate the invention, and should not be construed as limiting the invention in any way. Weights are given in grams unless noted otherwise. All of the salt spray tests were run according to ASTM B117-97.

Example 1

Post-Dip Composition Over Cured Electrocoat

Zinc phosphate nonchrome pretreated mild steel, heat-treated threaded fasteners were coated in a barrel with a standard cationic electrodepositable paint. The paint was formulated using CF670-424, a single-component black cationic feed, available from PPG Industries, Inc.; a 750-gallon pilot tank was filled with the paint. The feed material was designed to have a pigment to binder ratio (P/B) of 0.2/1.0, which yielded a total pigment solids of 6.04% and total resin solids of 30.36 percent. The bath was blended with deionized water to yield a solids level of 15 percent. The electrodeposition process was run so as to yield a DFT of 0.5 to 0.8 mil on the fasteners using the following parameters:

Barrel rotation: 5 second rotation, 55 second no rotation

Dwell time: 5 minutes

Voltage: 350

Barrel load: 500 lbs.

Bath temperature: 90° F.

Cure Temperature: 400° F./20 minutes metal temperature

Samples of the coated and cured fasteners were gathered and prepared for salt spray testing. The samples were divided; a portion were placed into the salt spray chamber as is (control), while the remainder were first immersed in a solution of yttrium acetate for 45 minutes, dried in a 350° F. oven for 10 minutes and then placed into the salt spray chamber. The yttrium acetate solution is available from PPG Industries, Inc. as CA135, and has a total solids level of 4.5 percent with a yttrium level of 1.5 percent. After 72 hours, all of the pieces showed about equal results, most showing pinpoint rusting on the sharp edges. After 96 hours the control fasteners began to show edge rusting along with the pinpoints, but the yttrium treated fasteners still had only small pinpoints. After 144 hours the unsealed control fasteners worsened, while the yttrium treated fasteners still had only small pinpoints. After 624 hours all of the fasteners were removed from the test. The control pieces exhibited severe rusting and failure. The yttrium treated fasteners exhibited only moderate rusting, outperforming all of the control pieces.

Example 2

Post-Dip Composition Over Uncured Electrocoat Films

A laboratory scale barrel coater was used to coat zinc phosphate, nonchrome, pretreated mild steel, heat treated threaded fasteners. A 10-gallon bath was formulated using CF670-424, described above, and was heated to 90° F. Coatout included a 5 minute dwell time in the barrel and a rotation cycle of 10 seconds on and 60 seconds off. The barrel load was 4000 grams (8.8 lbs.). Two groups of fasteners were electrocoated, one at 250 volts and the other at 350 volts. After the E-coat was applied, each batch was divided, with half of the fasteners kept as control and half immersed for 1 minute in the same yttrium acetate solution described in Example 1. After immersion, all of the fasteners were cured at 400° F. for 20 minutes metal temperature. The control fasteners had a coating dry film thickness (DFT) of 0.6 and 1.6 mils, respectively, for the 250 and 350 volt products, and the fasteners followed by a yttrium post-dip had a coating DFT of 0.7 and 1.7 mils, respectively. A sample of 10 fasteners from each group was put into salt spray testing. The following table outlines the results.

TABLE 1

| | | 96 hours | 216 hours | 500 hours |
|---|---|---|---|---|
| 250 Volts | Control | 5—pinpoints only<br>5—pinpoints and edge rust | 10—severe edge rust | Severe edge rust on all |
| | Post-dip treated | 3—pinpoints only<br>7—clean, no rust | 2—slight edge rust<br>3—pinpoint<br>5—clean | Few pinpoints on all edge rust on some |
| 350 Volts | Control | 8—pinpoints only<br>2—clean, no rust | 2—edge rust & pinpoints<br>8—heavy pintpoints | Pinpoint and edge rust on all |
| | Post-dip treated | 1—pinpoints only<br>9—clean, no rust | 1—pinpoints only<br>9—clean, no rust | Few pinpoints only, no edge rust |

As can be seen from the results presented in Table 1, the fasteners treated according to the present invention outperformed control fasteners.

Example 3

Post-Dip Composition Over Uncured Electrocoat Films

A standard formulation of P670-424, cationic black paint formulated to 15% total solids, was used to coat zinc phosphate, nonchrome, pretreated mild steel, heat-treated threaded fasteners. Coatout conditions to yield a 0.72 mil DFT on the fasteners were used. After coatout, the fasteners were rinsed and then immersed for 2 minutes in a fluorotitanic acid solution (500 ppm Ti as $H_2TiF_6$ in deionized water and adjusted to a pH of 4.5 with $NH_4OH$). The fasteners were cured at 400° F. for 30 minutes. A set of control fasteners was prepared in the same manner, absent the post-dip step.

After 500 hours of salt spray testing, the control fasteners had severe edge and face rust, while the fasteners treated according to the present invention showed some minor pinpoint rusting on the sharp edge and no face rust; the corrosion resistance was notably improved.

Example 4

Post-Dip Compositions

The zinc phosphate, nonchrome, pretreated mild steel, heat-treated threaded fasteners were first electrocoated in a basket using P670-424, as described in Example 3. The coatout conditions were set at 90° F. bath temperature, 160 volts and 60 seconds dwell time per coatout. The coatout process was done five times to allow for re-orientation of the fasteners for re-coat of any touch marks. The process yielded a DFT of 0.72 mils. Once the coatout was completed, E-coated fastener samples (uncured) from the basket were immersed in one of the following post-dip compositions for two minutes at ambient temperature. The post-dip compositions used in the trial were yttrium acetate (4.5% solids/1.5 yttrium), and aqueous solutions of lanthanum acetate hydrate (99.9%) and cerium acetate (5.95% cerium metal). (The lanthanum acetate was formulated (wt/wt) as follows: 30 grams lanthanum acetate to 470 grams deionized water.) The fasteners from each sample, along with a control having no post-dip, were then cured at 375° F. for 30 minutes.

The fasteners were then subjected to salt spray testing, with the results shown in Table 2.

TABLE 2

|  | 288 hour salt spray | 500 hour salt spray |
| --- | --- | --- |
| Control | 9—severe edge rust<br>1—pinpoint rust | 9—severe edge rust<br>1—moderate edge rust<br>4—>50% red rust |
| Lanthanum | 3—slight edge rust<br>7—clean, no rust | 2—severe edge rust<br>4—moderate edge rust<br>4—up to 5% red rust |
| Cerium | 3—slight edge rust<br>7—clean, no rust | 4—moderate edge rust<br>6—minor edge rust |
| Yttrium | 10—clean, no rust | 2—very minor edge rust<br>8—clean, no rust |

While the yttrium post-dip provided the best corrosion resistance performance, both lanthanum and cerium post-dips still show considerable improvement in corrosion resistance over a control with no post-dip applied.

Example 5

Evaluation of Tinted Post-Dip Compositions

Two tinted bath formulations were blended, one with yttrium acetate and one without. The breakdown of the formulations is as follows:

TABLE 3

|  | Formulation 1<br>Wt. % | Formulation 2<br>Wt. % |
| --- | --- | --- |
| Black air dry primer[1] | 14.80 | 15.44% |
| Black air dry primer[2] | 5.07 | 5.30% |
| Yttrium Acetate | 7.39 | — |
| Deionized water | 71.98 | 78.47 |
| Surfactant Pkg.[3] | 0.76 | 0.79 |
| Total Solids | 7.87 | 7.87 |
| P/B | 0.32/1.0 | 0.34/1.0 |
| Yttrium | 1106 ppm | — |

[1]W/B Black, Air Dry Primer, commercially available from PPG Industries, Inc.
[2]AUTOPRIME, commercially available from PPG industries, Inc.
[3]CHEMSHEEN surfactant, commercially available from PPG Industries, Inc.

Zinc phosphate, non-chrome pre-treated threaded fasteners were first coated with a standard cationic electrodepositable paint formulated to produce a corrosion resistant film. The paint was formulated using CR670 and CP415; CR670 is a cationic epoxy-based resin and CP415 is a cationic black pigment paste both of which are commercially available from PPG Industries, Inc. The paint formulation was filled into a 12-gallon tank to be trialed using a lab scale barrel coater. The bath was formulated at a solids level of 15 percent and a P/B of 0.2/1.0 with deionized water. The test bath was than heated to 90° F. for coating. The barrel cycle was set to produce a 90° rotation in 10 seconds with 50 seconds of no rotation. The coat out cycle was 5 minutes. To evaluate the formulations, the fasteners were coated out at a voltage that yielded a DFT of 0.85–0.90 mils; after rinsing with deionized water the fasteners were immersed into respective formulations for a period of two minutes at ambient temperature. After the dip cycle was completed, the fasteners were cured at 375° F. for 30 minutes. The fasteners were subjected to salt spray testing. The results are as follows:

TABLE 4

|  | 168 hour salt spray | 528 hour salt spray |
| --- | --- | --- |
| Control—no sealer | 8—>1% rust<br>2—pinpoint rust | 10—>50% rust |
| Formulation 1<br>(Yttrium containing sealer) | 4—clean, no rust<br>6—pinpoint rust | 3—<0.5% rust<br>4—5% rust<br>3—>25% rust |
| Formulation 2<br>(Non-yttrium sealer) | 3—clean, no rust<br>7—pinpoint rust | 2—<0.5% rust<br>3—10% rust<br>5—>25% rust |

Formulation 1, the tinted post-dip composition of the present invention, gave better results overall as compared with Formulation 2, (tinted but lacking yttrium) and especially as compared to control.

Example 6

Elevated Temperature of Post-Dip Compositions

Example 5, yttrium-containing post-dip (Formulation 1), was repeated by varying the temperature of the post-dip composition. Results are as follows:

TABLE 5

|  | Corrosion Results |
| --- | --- |
| Post-dip @ ambient | 10 fasteners with 1–2% red rust |
| Post-dip @ 95° F. | 1—pinpoints, red rust<br>1—1% red rust<br>8—<0.5% red rust |
| Control<br>no post-dip | 6—30% red rust<br>4—1–20% red rust |

As can be seen from the results of Table 5, the post-dip composition of the present invention gave better results than the control, lacking yttrium, with the heated post-dip composition giving better corrosion resistance than the post-dip used at ambient temperature.

Whereas particular embodiments of this invention have been described above for purposes of illustration, it will be evident to those skilled in the art that numerous variations of the details of the present invention may be made without departing from the invention as defined in the appended claims.

Therefore, what is claimed is:

1. A method for treating a metal substrate coated with an organic layer comprising contacting the coated substrate with an aqueous composition comprising a solution of one or more metal ions selected from yttrium, titanium, lanthanum, cerium, praseodymium, neodymium, promethium, samarium, europium, gadolinium, terbium, dysprosium, holmium, erbium, thulium, ytterbium, and lutetium.

2. The method of claim 1, wherein the metal ion is yttrium.

3. The method of claim 1, wherein the metal ion is titanium.

4. The method of claim 1, wherein the metal ion is lanthanum.

5. The method of claim 1, wherein the metal ion is cerium.

6. The method of claim 1, wherein the metal ion is in salt form.

7. The method of claim 6, wherein the composition comprises yttrium acetate.

8. The method of claim 1, wherein the metal ion concentration in the composition is between 400 and 5000 ppm.

9. The method of claim 5, wherein the metal ion concentration in the composition is 1100+/−100 ppm.

10. The method of claim 1, wherein the metal substrate comprises a ferrous metal.

11. The method of claim 1, wherein the metal substrate comprises a nonferrous metal.

12. The method of claim 1, wherein said contacting step occurs before the coating is cured.

13. The method of claim 12, wherein said contacting step is between 10 seconds and 5 minutes.

14. The method of claim 12, wherein curing is effected for between 10 and 60 minutes.

15. A method for treating a metal substrate coated with an organic layer comprising contacting the coated substrate with a composition comprising a solution of one or more metal ions selected from yttrium, titanium, lanthanum, cerium, praseodymium, neodymium, promethium, samarium, europium, gadolinium, terbium, dysprosium, holmium, erbium, thulium, ytterbium, and lutetium, wherein said contacting step occurs after curing of the coating.

16. The method of claim 15, wherein said contacting step is between 1 and 100 minutes.

17. The method of claim 15, wherein the substrate is dried in an oven after said contacting step.

18. The method of claim 1, wherein the substrate is pretreated before it is coated.

19. The method of claim 1, wherein the substrate is coated by electrodeposition with a cationic electrocoat composition.

20. A method for treating a metal substrate coated with an organic layer, comprising contacting the coated substrate with a composition comprising a solution of one or more metal ions selected from yttrium, titanium, lanthanum, cenum, praseodymium, neodymium, promethium, samarium, europium, gadolinium, terbium, dysprosium, holmium, erbium, thulium, ytterbium, and lutetium, wherein the substrate is coated by electrodeposition with a cationic electrocoat composition comprising a sulfonium acrylic composition.

21. The method of claim 1, wherein the composition is at room temperature during the contacting step.

22. The method of claim 1, wherein the composition is at a temperature of 1000° F.+/−15° F. during the contacting step.

23. A coated metal substrate treated according to the method of claim 1.

24. A method for inhibiting corrosion on a metal substrate coated with an organic layer, comprising contacting the coated substrate with a composition comprising a solution of one or more metals selected from yttrium, titanium, lanthanum, cerium, praseodymium, neodymium, promethium, samarium, europium, gadolinium, terbium, dysprosium, holmium, erbium, thulium, ytterbium, and lutetium.

25. A method for treating a metal substrate coated with an organic layer having areas where the coating has been removed, comprising contacting the coated substrate with a composition comprising a solution of one or more metal ions selected from yttrium, titanium, lanthanum, cenum, praseodymium, neodymium, promethium, samarium, europium, gadolinium, terbium, dysprosium, holmium, erbium, thulium, ytterbium, and lutetium.

26. The method of claim 25, wherein the coated metal substrate comprises small parts.

27. The method of claim 26, wherein the small parts are in and out of contact with one another while being coated.

* * * * *